United States Patent
Chasser et al.

(10) Patent No.: US 10,227,502 B2
(45) Date of Patent: Mar. 12, 2019

(54) METHODS FOR PREPARING CURABLE SOLID PARTICULATE COMPOSITIONS

(71) Applicant: PPG Industries Ohio, Inc., Cleveland, OH (US)

(72) Inventors: Anthony M. Chasser, Allison Park, PA (US); Susan Donaldson, Allison Park, PA (US); Simion Coca, Pittsburgh, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 0 days.

(21) Appl. No.: 14/921,004

(22) Filed: Oct. 23, 2015

(65) Prior Publication Data

US 2016/0046834 A1 Feb. 18, 2016

Related U.S. Application Data

(63) Continuation of application No. 13/785,415, filed on Mar. 5, 2013, now abandoned.

(51) Int. Cl.

| *C09D 5/03* | (2006.01) |
|---|---|
| *C09D 169/00* | (2006.01) |
| *C09D 175/04* | (2006.01) |
| *C08G 64/16* | (2006.01) |

(52) U.S. Cl.
CPC ........ *C09D 169/00* (2013.01); *C08G 64/1608* (2013.01); *C09D 5/03* (2013.01); *C09D 169/005* (2013.01); *C09D 175/04* (2013.01); *C08G 2150/20* (2013.01)

(58) Field of Classification Search
CPC ................................. C08G 2150/20
See application file for complete search history.

(56) References Cited

U.S. PATENT DOCUMENTS

| 3,072,613 | A | 1/1963 | Whelan et al. |
| 5,175,231 | A | 12/1992 | Rappoport et al. |
| 5,248,400 | A | 9/1993 | Franks et al. |
| 5,763,548 | A | 6/1998 | Matyjaszewski et al. |
| 5,789,487 | A | 8/1998 | Matyjaszewski et al. |
| 5,807,937 | A | 9/1998 | Matyjaszewski et al. |
| 5,856,382 | A | 1/1999 | Ohrbom et al. |
| 5,977,262 | A | 11/1999 | Anderson |
| 6,068,797 | A | 5/2000 | Hunt |
| 6,120,905 | A | 9/2000 | Figovsky |
| 6,218,483 | B1 | 4/2001 | Muthiah et al. |
| 6,265,489 | B1 | 7/2001 | Barkac et al. |
| 6,268,433 | B1 | 7/2001 | Barkac et al. |
| 6,319,988 | B1 | 11/2001 | Barkac et al. |
| 6,339,129 | B1 * | 1/2002 | Webster .................. C08F 18/24 427/385.5 |
| 6,538,091 | B1 | 3/2003 | Matyjaszewski et al. |
| 6,555,028 | B2 | 4/2003 | Walters et al. |
| 6,887,962 | B2 | 5/2005 | Matyjaszewski et al. |
| 6,924,379 | B2 | 8/2005 | Palanichamy et al. |
| 7,232,877 | B2 | 6/2007 | Figovsky et al. |
| 7,572,874 | B2 | 8/2009 | Matyjaszewski et al. |
| 7,666,952 | B2 | 2/2010 | Chasser et al. |
| 2003/0149191 | A1 * | 8/2003 | Ambrose ............... C08G 12/42 525/443 |
| 2005/0113594 | A1 * | 5/2005 | Van Holen ............ C07C 269/04 558/276 |
| 2012/0237701 | A1 | 9/2012 | Hanada et al. |
| 2012/0329939 | A1 * | 12/2012 | Peters .................... C08G 65/48 524/505 |
| 2013/0004677 | A1 | 1/2013 | Hwang et al. |

FOREIGN PATENT DOCUMENTS

| EP | 0835893 A1 | 4/1998 |
| JP | 2011105827 A | 6/2011 |

OTHER PUBLICATIONS

Rokicki, G. Makromol. Chem. 1985, 186, 331-337.*
Bisphenol A Safety Data Sheet; Sigma-Aldrich; May 16, 2017.*
O. Figovsky et al., "Progress in elaboration of nonisocyanate polyurethanes based on cyclic carbonates", International Letters of Chemistry Physics and Astronomy, 2012, pp. 55-66, XP055124740, Polymate Ltd.—International Nanotechnology Research Center, Migdal HaEmek, Israel.

* cited by examiner

*Primary Examiner* — Michael F Pepitone
(74) *Attorney, Agent, or Firm* — Michael J. Grese

(57) ABSTRACT

The present invention relates to curable solid particulate compositions that include: (a) a first reactant having at least two cyclic carbonate groups; and (b) a second reactant having at least two active hydrogen groups that are reactive with the cyclic carbonate groups of the first reactant. With some embodiments, the first reactant is a polyol residue having at least two cyclic carbonate groups, such as bisphenol A that has been reacted with epichlorohydrin, and in which the oxirane groups thereof have been converted to cyclic carbonate groups. The active hydrogen groups of the second reactant, with some embodiments, are each independently selected from hydroxyl groups, thiol groups, and amine groups. The curable solid particulate compositions, with some embodiments, are in the form of curable powder coating compositions.

21 Claims, No Drawings

METHODS FOR PREPARING CURABLE SOLID PARTICULATE COMPOSITIONS

CROSS REFERENCE TO RELATED PATENT APPLICATIONS

This application is a continuation of U.S. patent application Ser. No. 13/785,415, filed Mar. 5, 2013, the disclosure of which is incorporated herein by reference in its entirety.

FIELD OF THE INVENTION

The present invention relates to curable solid particulate compositions that include a first reactant having at least two cyclic carbonate groups, and a second reactant having at least two active hydrogen groups that are reactive with the cyclic carbonate groups of the first reactant.

BACKGROUND OF THE INVENTION

Reducing the environmental impact of coatings compositions, in particular that associated with emissions into the air of volatile organic compounds during their use, has been an area of ongoing investigation and development in recent years. Accordingly, interest in powder coatings has been increasing due, in part, to their inherently low volatile organic content (VOC), which significantly reduces air emissions during the application process. While both thermoplastic and thermosetting powder coatings compositions are commercially available, thermosetting powder coating compositions are typically more desirable because of the superior physical properties, such as hardness and solvent resistance, provided thereby.

Low VOC coatings are particularly desirable in a number of applications, such as the automotive original equipment manufacture (OEM) market, industrial market, and appliance market, due to the relatively large volume of coatings that are used in such markets. In addition to the requirement of low VOC levels, many manufacturers have strict performance requirements of the coatings that are used. In the case of basecoats, examples of such requirements include good corrosion resistance, substrate adhesion, and overcoat adhesion. In the case of topcoats, examples of such requirements include good corrosion resistance, adhesion (to undercoats and/or clear coatings applied thereover), exterior durability, solvent resistance, gloss, and appearance. While liquid coatings can provide such properties, they have the undesirable drawback of higher VOC levels relative to powder coatings, which have essentially zero VOC levels.

Curable powder coating compositions are available in a number of chemistries, such as: powder coating compositions that include epoxide functional polymer and epoxide reactive crosslinking agent; carboxylic acid functional polymer and betahydroxyalkylamide functional crosslinking agent; and hydroxyl functional polymer and capped isocyanate functional crosslinking agent. Presently available curable powder coating compositions can be subject to undesirable properties, such as insufficient storage stability at room temperature.

It would be desirable to develop new curable powder coating compositions that provide coatings having performance properties that are at least the same as those of presently available liquid and powder coating compositions. It would be further desirable that such newly developed powder coating compositions also possess at least a sufficient degree of storage stability at room temperature.

SUMMARY OF THE INVENTION

In accordance with the present invention, there is provided a curable solid particulate composition comprising: (a) a first reactant having at least two cyclic carbonate groups; and (b) a second reactant having at least two active hydrogen groups that are reactive with the cyclic carbonate groups of said first reactant.

In further accordance with the present invention, there is provided a method of coating a substrate with the curable solid particulate composition of the present invention.

In further accordance with the present invention, there is provided a coated substrate that comprises the curable solid particulate composition of the present invention in the form of a coating over at least a portion of at least one surface of the substrate.

The features that characterize the present invention are pointed out with particularity in the claims, which are annexed to and form a part of this disclosure. These and other features of the invention, its operating advantages, and the specific objects obtained by its use will be more fully understood from the following detailed description in which non-limiting embodiments of the invention are illustrated and described.

DETAILED DESCRIPTION OF THE INVENTION

As used herein, the articles "a," "an," and "the" include plural referents unless otherwise expressly and unequivocally limited to one referent.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

As used herein, unless otherwise indicated, left-to-right representations of linking groups, such as divalent linking groups, are inclusive of other appropriate orientations, such as, but not limited to, right-to-left orientations. For purposes of non-limiting illustration, the left-to-right representation of the divalent linking group

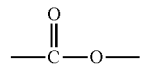

or equivalently —C(O)O—, is inclusive of the right-to-left representation thereof,

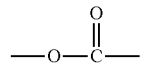

or equivalently —O(O)C— or —OC(O)—.

Other than in the operating examples, or where otherwise indicated, all numbers expressing quantities of ingredients, reaction conditions, and so forth used in the specification and claims are to be understood as modified in all instances by the term "about."

As used herein, molecular weight values of polymers, such as weight average molecular weights (Mw) and number average molecular weights (Mn), are determined by gel permeation chromatography using appropriate standards, such as polystyrene standards.

As used herein, polydispersity index (PDI) values represent a ratio of the weight average molecular weight (Mw) to the number average molecular weight (Mn) of the polymer (i.e., Mw/Mn).

As used herein, the term "polymer" means homopolymers (e.g., prepared from a single monomer species), copolymers (e.g., prepared from at least two monomer species), and graft polymers.

As used herein, the term "(meth)acrylate" and similar terms, such as "(meth)acrylic acid ester" means methacrylates and/or acrylates. As used herein, the term "(meth) acrylic acid" means methacrylic acid and/or acrylic acid.

As used herein, spatial or directional terms, such as "left", "right", "inner", "outer", "above", "below", and the like, relate to the invention as it is described herein. However, it is to be understood that the invention can assume various alternative orientations and, accordingly, such terms are not to be considered as limiting.

As used herein, the terms "formed over," "deposited over," "provided over," "applied over," "residing over," or "positioned over," mean formed, deposited, provided, applied, residing, or positioned on but not necessarily in direct (or abutting) contact with the underlying element, or surface of the underlying element. For example, a layer "positioned over" a substrate does not preclude the presence of one or more other layers, coatings, or films of the same or different composition located between the positioned or formed layer and the substrate.

As used herein, the term "free flowing" with regard to the curable solid particulate compositions of the present invention means a curable solid particulate composition having the handling characteristics of a substantially dry particulate composition, having a minimum of clumping or aggregation between individual particles.

As used herein, the terms "hydroxyl" and "hydroxy" both mean —OH groups.

All documents, such as but not limited to issued patents and patent applications, referred to herein, and unless otherwise indicated, are to be considered to be "incorporated by reference" in their entirety.

As used herein, recitations of "linear or branched" groups, such as linear or branched alkyl, are herein understood to include: a methylene group or a methyl group; groups that are linear, such as linear $C_2$-$C_{20}$ alkyl groups; and groups that are appropriately branched, such as branched $C_3$-$C_{20}$ alkyl groups.

As used herein, the term "aliphatic" means groups that are non-aromatic, such as but not limited to alkyl groups.

As used herein, the term "alkyl" means linear or branched alkyl, such as but not limited to, linear or branched $C_1$-$C_{20}$ alkyl, or linear or branched $C_1$-$C_{10}$ alkyl, or linear or branched $C_2$-$C_{10}$ alkyl. Examples of alkyl groups from which the various alkyl groups of the present invention can be selected from, include, but are not limited to, methyl, ethyl, propyl, isopropyl, butyl, isobutyl, sec-butyl, tert-butyl, pentyl, neopentyl, hexyl, heptyl, octyl, nonyl, and decyl. Alkyl groups of the various components of the present invention can, with some embodiments, include one or more unsaturated linkages selected from —CH═CH— groups and/or one or more —C≡C— groups, provided the alkyl group is free of two or more conjugated unsaturated linkages. With some embodiments, the alkyl groups are free of unsaturated linkages, such as —CH═CH— groups and —C≡C— groups.

As used herein, the term "cycloaliphatic" means cyclic groups that are non-aromatic, such as, but not limited to cycloalkyl groups.

As used herein, the term "cycloalkl" means groups that are appropriately cyclic, such as but not limited to, $C_3$-$C_{12}$ cycloalkyl (including, but not limited to, cyclic $C_5$-$C_7$ alkyl) groups. Examples of cycloalkyl groups include, but are not limited to, cyclopropyl, cyclobutyl, cyclopentyl, cyclohexyl, and cyclooctyl. The term "cycloalkyl" as used herein also includes: bridged ring polycycloalkyl groups (or bridged ring polycyclic alkyl groups), such as but not limited to, bicyclo[2.2.1]heptyl (or norbornyl) and bicyclo[2.2.2]octyl; and fused ring polycycloalkyl groups (or fused ring polycyclic alkyl groups), such as, but not limited to, octahydro-1H-indenyl, and decahydronaphthalenyl.

As used herein, the term "heterocycloaliphatic" means cyclic groups that are non-aromatic, such as but not limited to heterocycloalkyl groups, and which have at least one hetero atom in the cyclic ring, such as, but not limited to, O, S, N, P, and combinations thereof.

As used herein, the term "heterocycloalkyl" means groups that are appropriately cyclic, such as but not limited to, $C_3$-$C_{12}$ heterocycloalkyl groups or $C_5$-$C_7$ heterocycloalkyl groups, and which have at least one hetero atom in the cyclic ring, such as, but not limited to, O, S, N, P, and combinations thereof. Examples of heterocycloalkyl groups include, but are not limited to, imidazolyl, tetrahydrofuranyl, tetrahydropyranyl, and piperidinyl. The term "heterocycloalkyl" as used herein also includes: bridged ring polycyclic heterocycloalkyl groups, such as but not limited to, 7-oxabicyclo[2.2.1]heptanyl; and fused ring polycyclic heterocycloalkyl groups, such as but not limited to, octahydrocyclopenta[b]pyranyl, and octahydro-1H-isochromenyl.

As used herein, the term "aryl" and related terms, such as "aromatic", means cyclic groups that are aromatic, and includes, but is not limited to, $C_5$-$C_{18}$ aryl, such as but not limited to, $C_5$-$C_{10}$ aryl (including fused ring polycyclic aryl groups). Examples of aryl groups include, but are not limited to, phenyl, naphthyl, and anthracenyl.

As used herein, the term "heteroaryl" and related terms, such as "heteroaromatic", includes but is not limited to $C_5$-$C_{18}$ heteroaryl, such as but not limited to $C_5$-$C_{10}$ heteroaryl (including fused ring polycyclic heteroaryl groups) and means an aryl group having at least one hetero atom (such as but not limited to O, S, and N, and combinations thereof) in the aromatic ring, or in at least one aromatic ring in the case of a fused ring polycyclic heteroaryl group. Examples of heteroaryl groups include, but are not limited to, furanyl, pyranyl, pyridinyl, isoquinoline, and pyrimidinyl.

As used herein, remarks with regard to the active hydrogen groups of the second reactant being reactive with the cyclic carbonate groups of the first reactant, are inclusive of the cyclic carbonate groups of the first reactant and the active hydrogen groups of the second reactant being reactive with each other.

The first reactant of the curable solid particulate compositions of the present invention includes at least two cyclic carbonate groups. With some embodiments, and for purposes of non-limiting illustration, the cyclic carbonate groups of the first reactant can be represented by the following Formula (I),

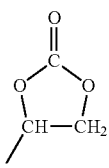

Formula (I)

With some embodiments of the present invention, the first reactant is formed from a precursor material that has at least two oxirane groups (such as a polyester having at least two oxirane groups), in which at least two oxirane groups thereof have been converted to cyclic carbonate groups. More particularly, at least two of the oxirane groups and, with some embodiments, substantially all of the oxirane groups, of the precursor material are converted to cyclic carbonate groups.

Conversion of the oxirane groups of the precursor material can be conducted, with some embodiments, in accordance with art-recognized methods. For purposes of non-limiting illustration, conversion of oxirane groups to cyclic carbonate groups is provided in the following general Scheme (I),

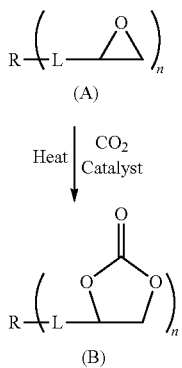

Scheme (I)

With reference to general Scheme (I) and in accordance with some embodiments, (A) represents a precursor material having n oxirane groups that are converted to cyclic carbonate groups, and (B) represents the first reactant of the compositions of the present invention having n cyclic oxirane groups. The group R, with some embodiments, represents a residue of a material to which n oxirane groups are bonded by divalent linking group L in (A), and to which n cyclic carbonate groups are bonded by divalent linking group L in (B). For purposes of non-limiting illustration, with some embodiments the first reactant is selected from a polyester having at least two cyclic carbonate groups, in which case and correspondingly R is the polyester (or residue of the polyester).

In accordance with some embodiments, R of precursor material (A) and first reactant (B) of Scheme (I) is in each case a residue of a material selected from vegetable oils, polyols, isocyanurates, polyesters, polyethers, polyurethanes, polymers prepared by free radical polymerization, polymers prepared by controlled radical polymerization, and combinations of two or more thereof.

With further reference to general Scheme (I), Subscript n, with some embodiments, is at least 2, such as from 2 to 100, or from 2 to 80, or from 2 to 50, or from 2 to 40, or from 2 to 30, or from 2 to 20, or from 2 to 10, or from 2 to 5, in each case inclusive of the recited values. Divalent linking group L can, with some embodiments, be selected from a bond, a divalent alkyl group, a divalent cycloalkyl group, a divalent heterocycloalkyl group, a divalent aryl group, a divalent heteroaryl group, and a heteroatom, such as, but not limited to, O, N, S, and P, and combinations of two or more thereof (such as, but not limited to, a combination of a divalent alkyl group and one or more heteroatoms, such as O, N, S, and P). With some embodiments, divalent linking group L is a divalent methylene oxide group represented by the following Formula (II), —O—CH$_2$—  Formula (II)

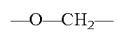

With some embodiments, the divalent oxygen (—O—) of Formula (II) is bonded to R of (A) and (B), and the divalent methylene group (—CH$_2$—) is bonded to the oxirane group of (A) and the cyclic carbonate group of (B), of Scheme (I).

Precursor material (A) can be formed in accordance with art-recognized methods, such as but not limited to: reaction of an active hydrogen functional material (such as, but not limited to, a hydroxyl and/or thiol functional material) with an oxirane functional material having a group that is reactive with active hydrogen groups (such as, but not limited to, reactive with hydroxyls and/or thiols); and reaction of an ethylenically unsaturated material with an oxygen source, such as, but not limited to, ozone and a peroxyacid, which converts each (or at least two) ethylenically unsaturated group into an oxirane group.

With some embodiments, precursor material (A) is formed, in accordance with art-recognized methods, from reaction of: (i) a hydroxyl functional material R—(OH)$_n$, where n is as described above; with (ii) an oxirane functional material having at least one oxirane group and a group that is reactive with the hydroxyls of the hydroxyl functional material, such as, but not limited to, epichlorohydrin

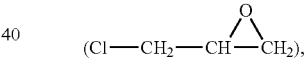

(Cl—CH$_2$—CH—CH$_2$),

With some embodiments, when precursor material (A) is the result of the reaction of a hydroxyl functional material R—(OH)$_n$ and epichlorohydrin, divalent linking group L is represented by Formula (II) above.

With some further embodiments, precursor material (A) is formed, in accordance with art-recognized methods, from reaction of: (i) a material that includes at least two ethylenically unsaturated groups; and (ii) an oxygen source, such as, but not limited to, a peroxyacid, such as, but not limited to, haloperoxybenzoic acid, such as m-chloroperoxybenzoic acid. The material that includes at least two ethylenically unsaturated groups is, with some embodiments, selected from one or more vegetable oils, such soybean oil, in which case precursor material (A) is an expoxidized vegetable oil, such as epoxidized soybean oil. As used herein, the term "vegetable oil" also includes nut oils. With some embodiments, the vegetable oil includes, but is not limited to, palm oil, soybean oil, rapeseed oil, sunflower seed oil, peanut oil, cottonseed oil, palm kernel oil, coconut oil, olive oil, corn oil, grape seed oil, hazelnut oil, linseed oil, rice bran oil, safflower oil, sesame seed oil, and combinations of two or more thereof.

With some further embodiments, the material that includes at least two ethylenically unsaturated groups (from which precursor material (A) can be prepared, with some embodiments) is selected from vegetable oils having at least two ethylenically unsaturated groups, polyols having at least two ethylenically unsaturated groups, isocyanurates having at least two ethylenically unsaturated groups, polyesters having at least two ethylenically unsaturated groups, polyethers having at least two ethylenically unsaturated groups, polyurethanes having at least two ethylenically unsaturated groups, polymers prepared by free radical polymerization having at least two ethylenically unsaturated groups, and polymers prepared by controlled radical polymerization having at least two ethylenically unsaturated groups.

The conversion of oxirane groups of (A) to cyclic carbonate groups of (B), as represented in general Scheme (I), is typically conducted under conditions of elevated temperature (as represented by the term Heat), such as from 70° C. to 140° C., in the presence of gaseous carbon dioxide, and optionally a solvent, such as an inert solvent. The carbon dioxide can, with some embodiments, be bubbled continuously through the reaction medium. With some further embodiments, a measured quantity of carbon dioxide is charged to the reaction optionally under elevated pressure, such as from 60 to 150 psi. The reaction can be conducted in the presence of a suitable solvent, such as an alcohol, for example, isobutanol. The reaction is typically conducted in the presence of a suitable catalyst, such as a tetraalkyl ammonium iodide and/or tetraalkyl ammonium bromide, for example, tetrabutylammonium iodide and/or tetrabutylammonium bromide. After art-recognized work-up procedures, the product (B) is isolated.

With additional reference to general Scheme (I) and in accordance with some embodiments, (A) represents a precursor monomer having n oxirane groups bonded thereto, such as a radically polymerizable oxirane functional ethylenically unsaturated monomer. Correspondingly, (B) represents a monomer having n cyclic carbonate groups bonded thereto, such as a radically polymerizable cyclic carbonate functional ethylenically unsaturated monomer, from which the first reactant of the compositions of the present invention can be prepared, such as by controlled radical polymerization or free radical polymerization. With some non-limiting embodiments where (A) represents a precursor monomer and (B) represents a monomer, subscript n is at least 1, such as from 1 to 4, or from 1 to 3, or 1 to 2, inclusive of the recited values.

In accordance with some embodiments, a polymer is prepared by controlled radical polymerization or free radical polymerization from a radically polymerizable oxirane functional precursor monomer, such as represented by (A) in Scheme (I). After formation of the polymer, the oxirane groups of the oxirane functional precursor monomer residues (or units) that have been incorporated into the polymer backbone, are converted to cyclic carbonate groups, with some embodiments.

In accordance with some embodiments of the present invention, the first reactant, of the curable particulate composition, is selected from: polyol residues having at least two cyclic carbonate groups; isocyanurates having at least two cyclic carbonate groups; polyesters having at least two cyclic carbonate groups; polyethers having at least two cyclic carbonate groups; polyurethanes having at least two cyclic carbonate groups; polymers prepared by free radical polymerization having at least two cyclic carbonate groups; polymers prepared by controlled radical polymerization having at least two cyclic carbonate groups; and combinations of two or more thereof.

As used herein, the term "polyol residue" and related terms, such as "polyol residues," "polyol," and "polyols," with regard to polyol residues having at least two cyclic carbonate groups, means residues of polyols that are structurally distinguishable from: the polyester residues of the polyesters having at least two cyclic carbonate groups; the polyether residues of the polyethers having at least two cyclic carbonate groups; the polyurethane residues of the polyurethanes having at least two cyclic carbonate groups; polymer residues of the polymers prepared by free radical polymerization having at least two cyclic carbonate groups; and the polymer residues of the polymers prepared by controlled radical polymerization having at least two cyclic carbonate groups. With some embodiments, the term "polyol residue" and related terms with regard to polyol residues having at least two cyclic carbonate groups, is a non-polymeric material that is free of repeating monomer units (or monomer residues).

The polyol residues having at least two cyclic carbonate groups are, with some embodiments, each independently formed from a polyol residue having at least two oxirane groups that have been converted to cyclic carbonate groups. The oxirane groups can be converted to cyclic carbonate groups in accordance with art-recognized methods, such as described previously herein with reference to general Scheme (I), in which case R represents a polyol residue.

With some embodiments, the polyol residue (from which the polyol residues having at least two cyclic carbonate groups are formed) is a residue of a polyol selected from aliphatic polyols and/or aromatic polyols. In accordance with some further embodiments, the polyol residue (from which the polyol residues having at least two cyclic carbonate groups are formed) is a residue of a polyol selected from glycerin, trimethylolpropane, trimethylolethane, trishydroxyethylisocyanurate, pentaerythritol, ethylene glycol, propylene glycol, trimethylene glycol, butanediol, heptanediol, hexanediol, octanediol, 4,4'-(propane-2,2-diyl)dicyclohexanol, 4,4'-methylenedicyclohexanol, neopentyl glycol, 2,2,3-trimethylpentane-1,3-diol, 1,4-dimethylolcyclohexane, 2,2,4-trimethylpentane diol, 4,4'-(propane-2,2-diyl)diphenol, and 4,4'-methylenediphenol.

The polyol residue, with some embodiments, (from which the polyol residues having at least two cyclic carbonate groups are formed) is a residue of a polyol selected from 4,4'-(propane-2,2-diyl)diphenol, 4,4'-(propane-2,2-diyl)dicyclohexanol, 4,4'-methylenediphenol, 4,4'-methylenedicyclohexanol, and combinations thereof.

The polyol residue having at least two oxirane groups can be formed in accordance with art-recognized methods. With some embodiments, the polyol residue having at least two oxirane groups is formed from the reaction of one mole of a polyol having at least two hydroxyl groups, with at least two moles of epichlorohydrin under art-recognized reaction and work-up conditions.

The cyclic carbonate equivalent weight of the polyol residues having at least two cyclic carbonate groups is, with some embodiments, less than or equal to 1000 grams/equivalent, such as from 100 to 1000 grams/equivalent.

In accordance with some further embodiments of the present invention, the isocyanurates having at least two cyclic carbonate groups, from which the first reactant can be selected, are each independently formed from an isocyanurate having at least two oxirane groups that have been converted to cyclic carbonate groups. The oxirane groups, of the oxirane functional isocyanurate, can be converted to cyclic carbonate groups in accordance with art-recognized methods, such as described previously herein with reference to general Scheme (I), in which case R represents an isocyanurate.

The isocyanurate having at least two oxirane groups is, with some embodiments, tris(2,3-epoxypropyl)isocyanurate. At least two of the oxirane groups of the tris(2,3-epoxypropyl)isocyanurate are converted to cyclic carbonate groups, such as described previously herein with reference to Scheme (1), with some embodiments. With some further embodiments, all three of the oxirane groups of the tris(2,3-epoxypropyl)isocyanurate are converted to cyclic carbonate groups, such as described previously herein with reference to Scheme (I).

The cyclic carbonate equivalent weight of the isocyanurates having at least two cyclic carbonate groups is, with some embodiments, less than or equal to 1000 grams/equivalent, such as from 100 to 1000 grams/equivalent.

In accordance with some additional embodiments of the present invention, the polyesters having at least two cyclic carbonate groups, from which the first reactant can be selected, are each individually formed form a polyester having at least two oxirane groups that have been converted to cyclic carbonate groups. With some embodiments, at least two hydroxyl groups of a polyester having at least two hydroxyl groups are reacted with an oxirane functional material, such as a 1-halo-2,3-epoxy propane, such as epichlorohydrin, so as to form a polyester having at least two oxirane groups, in accordance with art-recognized methods. At least two of the oxirane groups of the polyester having at least two oxirane groups can subsequently be converted to cyclic carbonate groups in accordance with art-recognized methods, such as described previously herein with reference to general Scheme (I), in which case R represents a polyester.

Hydroxyl functional polyesters, from which polyesters having at least two cyclic carbonate groups can be prepared, typically have an average of at least two hydroxyl groups per polyester molecule. Polyesters having hydroxyl functionality can be prepared by art-recognized methods, which include reacting carboxylic acids (or their anhydrides) having acid functionalities of at least 2, and polyols having hydroxy functionalities of at least 2. The molar equivalents ratio of carboxylic acid groups to hydroxy groups of the reactants is selected such that the resulting polyester has hydroxyl functionality and a desired molecular weight.

Examples of multifunctional carboxylic acids useful in preparing hydroxyl functional polyesters include, but are not limited to, benzene-1,2,4-tricarboxylic acid, phthalic acid, tetrahydrophthalic acid, hexahydrophthalic acid, endobicyclo-2,2,1,5-heptyne-2,3-dicarboxylic acid, tetrachlorophthalic acid, cyclohexanedioic acid, succinic acid, isophthalic acid, terephthalic acid, azelaic acid, maleic acid, trimesic acid, 3,6-dichlorophthalic acid, adipic acid, sebacic acid, and like multifunctional carboxylic acids.

Examples of polyols useful in preparing hydroxyl functional polyesters include, but are not limited to, the polyols recited previously herein with regard to the polyols from which the polyol residues having at least two cyclic carbonate groups can be prepared. With some embodiments, polyols (from which polyesters having at least two cyclic carbonate groups can be prepared) include, but are not limited to, glycerin, trimethylolpropane, trimethylolethane, trishydroxyethylisocyanurate, pentaerythritol, ethylene glycol, propylene glycol, trimethylene glycol, 1,3-, 1,2- and 1,4-butanediols, heptanediol, hexanediol, octanediol, 2,2-bis(4-cyclohexanol)propane, neopentyl glycol, 2,2,3-trimethylpentane-1,3-diol, 1,4-dimethylolcyclohexane, 2,2,4-trimethylpentane diol, and like polyols.

Polyesters having at least two cyclic carbonate groups, from which the first reactant can be selected, have an Mn of less than or equal to 10,000, such as from 1,000 to 10,000, or from 2,000 to 7,000, with some embodiments. The cyclic carbonate equivalent weight of the polyesters having at least two cyclic carbonate groups is, with some embodiments, less than or equal to 3000 grams/equivalent, such as from 300 to 2,000 grams/equivalent.

With some embodiments, the polyethers having at least two cyclic carbonate groups, from which the first reactant can be selected, are each individually formed from a polyether having at least two oxirane groups that have been converted to cyclic carbonate groups. With some embodiments, at least two hydroxyl groups of a polyether having at least two hydroxyl groups are reacted with an oxirane functional material, such as a 1-halo-2,3-epoxy propane, such as epichlorohydrin, so as to form a polyether having at least two oxirane groups, in accordance with art-recognized methods. At least two of the oxirane groups of the polyether having at least two oxirane groups can subsequently be converted to cyclic carbonate groups in accordance with art-recognized methods, such as described previously herein with reference to general Scheme (I), in which case R represents a polyether.

The polyethers, from which the polyethers having at least two cyclic carbonate groups of the present invention can be prepared, can themselves be prepared in accordance with art-recognized methods. With some embodiments, the polyethers can be prepared from polyols having two or more hydroxy groups and polyepoxides having two or more epoxide groups, which are reacted in proportions such that the resulting polyether has hydroxy functionality or oxirane functionality. The polyols and polyepoxides used in the preparation of the epoxide functional polyether may be selected from, for example, aliphatic, cycloaliphatic, and aromatic polyols and polyepoxides, and mixtures thereof. Specific examples of polyols include those recited previously herein. Polyepoxides useful in preparing the hydroxy functional polyether include, with some embodiments, those resulting from the reaction of a polyol and epichlorohydrin. With some embodiments, one or more of the polyols recited previously herein can be reacted with epichlorohydrin, so as to result in the formation of a polyepoxide. For purposes of non-limiting illustration, the hydroxy functional polyether can be prepared, with some embodiments, from: 4,4'-(propane-2,2-diyl)diphenol and the diglycidyl ether of 4,4'-(propane-2,2-diyl)diphenol; or 4,4'-(propane-2,2-diyl)dicylcohxanol and the diglycidyl ether of 4,4'-(propane-2,2-diyl)dicylcohexanol.

The polyethers having at least two cyclic carbonate groups, with some embodiments, can have an Mn of less than 10,000, such as from 1,000 and 7,000. The cyclic carbonate equivalent weight of the polyethers having at least two cyclic carbonate groups is, with some embodiments, less than or equal to 3,000 grams/equivalent, such as from 300 and 2,000 grams/equivalent.

The polyurethanes having at least two cyclic carbonate groups, from which the first reactant can be selected, with some embodiments, are each individually formed from a polyurethane having at least two oxirane groups that have been converted to cyclic carbonate groups. The polyurethane having at least two oxirane groups can be prepared from a polyurethane having at least two hydroxyl groups. At least two hydroxy groups of the hydroxy functional polyurethane can be reacted with an oxirane functional material, such as epichlorohydrin, which results in formation of the polyurethane having at least two oxirane groups. At least two of the oxirane groups of the polyurethane having at least two oxirane groups can be converted to cyclic oxirane groups in accordance with art-recognized methods, such as described previously herein with reference to Scheme-(I), in which case R represents a polyurethane.

Hydroxyl functional polyurethanes can be prepared in accordance with art-recognized methods, such as by reaction of a polyisocyanate having at least two isocyanate groups, with a polyol having at least two hydroxy groups, with an appropriate molar excess of hydroxyl groups, so as to form a hydroxyl functional polyurethane having at least 2 hydroxyl groups. Examples of polyisocyanates useful in the preparation of polyurethane polyols include, with some embodiments, aliphatic, aromatic, cycloaliphatic and heterocyclic polyisocyanates, and mixtures of such polyisocyanates.

Further examples of polyisocyanates useful in the preparation of polyurethane polyols include, but are not limited to, toluene-2,4-diisocyanate; toluene-2,6-diisocyanate; diphenyl methane-4,4'-diisocyanate; diphenyl methane-2,4'-diisocyanate; para-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethyl hexane-1,6-diisocyanate; lysine methyl ester diisocyanate; bis(isocyanato ethyl)fumarate; isophorone diisocyanate; ethylene diisocyanate; dodecane-1,12-diisocyanate; cyclobutane-1,3-diisocyanate; cyclohexane-1,3-diisocyanate; cyclohexane-1,4-diisocyanate; methyl cyclohexyl diisocyanate; hexahydrotoluene-2,4-diisocyanate; hexahydrotoluene-2,6-diisocyanate; hexahydrophenylene-1,3-diisocyanate; hexahydrophenylene-1,4-diisocyanate; perhydrodiphenylmethane-2,4'-diisocyanate; perhydrodiphenylmethane-4,4'-diisocyanate, and mixtures thereof.

Examples of polyols having at least two hydroxyl groups, from which the hydroxy functional polyurethane can be prepared, include, but are not limited to, those polyols recited previously herein. With some embodiments, the polyols, from which the hydroxy functional polyurethane can be prepared, can be selected from those recited previously herein with regard to the polyols from which the polyol residues having at least two cyclic carbonate groups can be prepared. With some further embodiments, the polyols, from which the hydroxy functional polyurethane can be prepared, can be selected from those recited previously herein with regard to the hydroxy functional polyester.

The polyurethanes having at least two cyclic carbonate groups, with some embodiments, can have an Mn of less than 10,000, such as from 100 and 7,000. The cyclic carbonate equivalent weight of the polyurethanes having at least two cyclic carbonate groups is, with some embodiments, less than or equal to 3,000 grams/equivalent, such as from 100 to 2,000 grams/equivalent.

With some embodiments, polymers prepared by free radical polymerization having at least two cyclic carbonate groups, from which the first reactant can be selected, each independently include or have at least two residues of oxirane functional ethylenically unsaturated monomers in which the oxirane groups have been converted to cyclic carbonate groups. The oxirane groups of the oxirane functional ethylenically unsaturated monomers can be converted to cyclic carbonate groups before and/or after the polymer has been prepared by free radical polymerization.

Polymers prepared by free radical polymerization having at least two cyclic carbonate groups can, with some embodiments, be prepared by copolymerizing epoxide functional ethylenically unsaturated radically polymerizable monomer(s), such as a glycidyl functional (meth)acrylate, such as glycidyl (meth)acrylate, with ethylenically unsaturated radically polymerizable monomer(s) free of epoxide functionality, such as alkyl (meth)acrylates. Polymers prepared by free radical polymerization having at least two cyclic carbonate groups can, with some further embodiments, be prepared by copolymerizing cyclic carbonate functional ethylenically unsaturated radically polymerizable monomer(s), such as a cyclic carbonate functional (meth)acrylate, such as (2-oxo-1,3-dioxolan-4-yl)methyl methacrylate, with ethylenically unsaturated radically polymerizable monomer(s) free of cyclic carbonate functionality, such as alkyl (meth)acrylates.

With some embodiments, the polymers prepared by free radical polymerization having at least two cyclic carbonate groups are acrylic polymers having at least two cyclic carbonate groups.

The conventional free radical polymerization methods by which the cyclic carbonate functional polymer can be prepared involve, with some embodiments, the use of free radical initiators, such as organic peroxides and/or azo type compounds. Optionally, chain transfer agents can also be used, such as alpha-methyl styrene dimer and/or tertiary dodecyl mercaptan.

Examples of oxirane functional ethylenically unsaturated radically polymerizable monomers that can be used, with some embodiments, in the preparation of the polymers prepared by free radical polymerization having at least two cyclic carbonate groups include, but are not limited to, glycidyl (meth)acrylate, 3,4-epoxycyclohexylmethyl (meth)acrylate, 2-(3,4-epoxycyclohexyl)ethyl (meth)acrylate and allyl glycidyl ether. Examples of cyclic carbonate functional ethylenically unsaturated radically polymerizable monomers that can be used, with some embodiments, in the preparation of the polymers prepared by free radical polymerization having at least two cyclic carbonate groups include, but are not limited to, the previously recited oxirane functional (meth)acrylate monomers, in which the oxirane groups thereof have been converted to cyclic carbonate groups in accordance with art-recognized methods, such as described previously herein with reference to Scheme (I), such as (2-oxo-1,3-dioxolan-4-yl)methyl methacrylate.

Ethylenically unsaturated radically polymerizable monomer(s) free of epoxide functionality and free of cyclic carbonate functionality that can be used to prepare the polymers prepared by free radical polymerization having at least two cyclic carbonate groups include, but are not limited to, vinyl monomers, allylic monomers, olefins, and other ethylenically unsaturated monomers that are radically polymerizable.

Classes of vinyl monomers that are free of oxirane and cyclic carbonate functionality include, but are not limited to, (meth)acrylates, vinyl aromatic monomers, vinyl halides and vinyl esters of carboxylic acids. With some embodiments, the (meth)acrylates are selected from at least one of alkyl (meth)acrylates having from 1 to 20 carbon atoms in the alkyl group. Examples of alkyl (meth)acrylates having from 1 to 20 carbon atoms in the alkyl group that can be used include, but are not limited to, methyl (meth)acrylate, ethyl (meth)acrylate, propyl (meth)acrylate, isopropyl (meth)acrylate, butyl (meth)acrylate, isobutyl (meth)acrylate, tert-butyl (meth)acrylate, 2-ethylhexyl (meth)acrylate, lauryl (meth)acrylate, isobornyl (meth)acrylate, cyclohexyl (meth)acrylate and 3,3,5-trimethylcyclohexyl (meth)acrylate.

Examples of vinyl aromatic monomers that are free of oxirane and cyclic carbonate functionality include, but are not limited to, styrene, p-chloromethylstyrene, divinyl benzene, vinyl naphthalene and divinyl naphthalene. Vinyl halides from which M may be derived include, but are not limited to, vinyl chloride and vinylidene fluoride. Vinyl esters of carboxylic acids that are free of oxirane and cyclic carbonate functionality include, but are not limited to, vinyl acetate, vinyl butyrate, vinyl 3,4-dimethoxybenzoate and vinyl benzoate.

As used herein, by "olefin" and like terms is meant unsaturated aliphatic hydrocarbons having one or more double bonds, such as obtained by cracking petroleum fractions. Examples of olefins that are free of oxirane and cyclic carbonate functionality include, but are not limited to, propylene, 1-butene, 1,3-butadiene, isobutylene and diisobutylene.

As used herein, by "allylic monomer(s)" is meant monomers containing substituted and/or unsubstituted allylic functionality, such as one or more radicals represented by the following Formula (I),

$$H_2C=C(R_1)-CH_2-$$ (I)

With reference to Formula (I), $R_1$ is hydrogen, halogen or a $C_1$ to $C_4$ alkyl group. With some embodiments, $R_1$ is hydrogen or methyl and consequently Formula (I) represents an unsubstituted (meth)allyl radical. Examples of allylic monomers that are free of oxirane and cyclic carbonate functionality include, but are not limited to: (meth)allyl alcohol; (meth)allyl ethers, such as methyl (meth)allyl ether; allyl esters of carboxylic acids, such as (meth)allyl acetate, (meth)allyl butyrate, (meth)allyl 3,4-dimethoxybenzoate and (meth)allyl benzoate.

Other ethylenically unsaturated radically polymerizable monomers that are free of oxirane and cyclic carbonate functionality include, but are not limited to: cyclic anhydrides, such as maleic anhydride, 1-cyclopentene-1,2-dicarboxylic anhydride and itaconic anhydride; esters of acids that are unsaturated but do not have alpha, beta-ethylenic unsaturation, such as methyl ester of undecylenic acid; and diesters of ethylenically unsaturated dibasic acids, such as diethyl maleate.

The polymers prepared by free radical polymerization having at least two cyclic carbonate groups (or cyclic carbonate functional polymers prepared by free radical polymerization) can have, with some embodiments, a cyclic carbonate equivalent weight of at least 100 grams/equivalent, or at least 200 grams/equivalent. The cyclic carbonate equivalent weight of the polymer is, with some embodiments, less than 10,000 grams/equivalent, or less than 5,000 grams/equivalent, or less than 1,000 grams/equivalent. The cyclic carbonate equivalent weight of the cyclic carbonate functional polymer prepared by free radical polymerization can range between any combination of these values, inclusive of the recited values, such as from 100 to 10,000 grams/equivalent, or from 200 to 5,000 grams/equivalent, or from 200 to 1,000 grams/equivalent, inclusive of the recited values.

The number average molecular weight (Mn) of the polymers prepared by free radical polymerization having at least two cyclic carbonate groups (or the cyclic carbonate functional polymer prepared by free radical polymerization) is with some embodiments at least 250, or at least 500, or at least 1,000, or at least 2,000. The cyclic carbonate functional polymer prepared by controlled radical polymerization also has, with some embodiments, an Mn of less than 16,000, or less than 10,000, or less than 5,000. The Mn of the cyclic carbonate functional polymer prepared by free radical polymerization can, with some embodiments, range between any combination of these values, inclusive of the recited values, such as from 250 to 16,000, or from 500 to 10,000, or from 1,000 to 5,000, or from 2,000 to 5,000, inclusive of the recited values.

In accordance with some further embodiments, polymers prepared by controlled radical polymerization having at least two cyclic carbonate groups each independently have or include at least two residues of oxirane functional ethylenically unsaturated monomers in which the oxirane groups have been converted to cyclic carbonate groups. The oxirane groups of the oxirane functional ethylenically unsaturated monomers can be converted to cyclic carbonate groups before and/or after the polymer has been prepared by controlled radical polymerization in accordance with art-recognized methods, such as described previously herein with reference to Scheme (I).

Controlled radical polymerization methods include, but are not limited to, atom transfer radical polymerization (ATRP), single electron transfer polymerization (SETP), reversible addition-fragmentation chain transfer (RAFT), and nitroxide-mediated polymerization (NMP).

Controlled radical polymerization, such as ATRP, is described generally as a "living polymerization," i.e., a chain-growth polymerization that propagates with essentially no chain transfer and essentially no chain termination. The molecular weight of a polymer prepared by controlled radical polymerization can be controlled by the stoichiometry of the reactants, such as the initial concentration of monomer(s) and initiator(s). In addition, controlled radical polymerization also provides polymers having characteristics including, but not limited to: narrow molecular weight distributions, such as polydispersity index (PDI) values less than 2.5; and/or well defined polymer chain structure, such as block copolymers and alternating copolymers, with some embodiments.

For purposes of non-limiting illustration of controlled radical polymerization processes, the ATRP process will be described in further detail. The ATRP process can be described generally as including: polymerizing one or more radically polymerizable monomers in the presence of an initiation system; forming a polymer, and isolating the formed polymer. The initiation system includes, with some embodiments: an initiator having a radically transferable atom or group; a transition metal compound, such as a catalyst, which participates in a reversible redox cycle with the initiator, and a ligand, which coordinates with the transition metal compound. The ATRP process is described in further detail in U.S. Pat. Nos. 5,763,548, 5,789,487, 5,807,937, 6,538,091, 6,887,962, and 7,572,874. With some embodiments, the polymers prepared by controlled radical polymerization having at least two cyclic carbonate groups, are prepared generally in accordance with the ATRP method disclosed at column 4, line 12, through column 5, line 67 of U.S. Pat. No. 6,265,489 BI, which disclosure is incorporated herein by reference.

With some embodiments, the ATRP initiator is selected from halomethane, methylenedihalide, haloform, carbon tetrahalide, 1-halo-2,3-epoxypropane, methanesulfonyl halide, p-toluenesulfonyl halide, methanesulfenyl halide, p-toluenezsulfenyl halide, 1-phenylethyl halide, $C_1$-$C_6$-alkyl ester of 2-halo-$C_1$-$C_6$-carboxylic acid, p-halomethylstyrene, mono-hexakis (alpha-halo-$C_1$-$C_6$-alkyl)benzene, diethyl-2-halo-2-methyl malonate, ethyl 2-bromoisobutyrate and mixtures thereof. With some further embodiments, the initiator is diethyl-2-bromo-2-methyl malonate.

Catalysts that can be used in some embodiments in preparing polymers prepared by controlled radical polymerization (such as ATRP) having at least two cyclic carbonate groups, include any transition metal compound that can participate in a redox cycle with the initiator and the growing polymer chain. With some embodiments, the transition metal compound is selected such that it does not form direct carbon-metal bonds with the polymer chain. Transition metal catalysts useful in the present invention may be represented by the following Formula (II),

$$TM^{n+}X_t \qquad (II)$$

With reference to Formula (II), TM represents the transition metal, t is the formal charge on the transition metal having a value of from 0 to 7, and X is a counterion or covalently bonded component. Examples of the transition metal (TM) include, but are not limited to, Cu, Fe, Au, Ag, Hg, Pd, Pt, Co, Mn, Ru, Mo, Nb and Zn. Examples of X include, but are not limited to, halogen, hydroxy, oxygen, $C_1$-$C_6$-aloxy, cyano, cyanato, thiocyanato, and azido. With some embodiments, the transition metal is Cu(I) and X is a halogen, such as chloride. Accordingly, with some embodiments, a class of transition metal catalysts are the copper halides, such as Cu(I)Cl. With some embodiments the transition metal catalyst contains a small amount, such as 1 mole percent, of a redox conjugate, for example, $Cu(II)Cl_2$ when Cu(I)Cl is used.

Ligands that can be used in preparing the polymers prepared by controlled radical polymerization (such as ATRP) having at least two cyclic carbonate groups, include, but are not limited to compounds having one or more nitrogen, oxygen, phosphorus and/or sulfur atoms, which can coordinate to the transition metal catalyst compound, such as through sigma and/or pi bonds. Classes of useful ligands include, but are not limited to: unsubstituted and substituted pyridines and bipyridines; porphyrins; cryptands; crown ethers, such as 18-crown-6; polyamines, such as ethylenediamine; glycols, such as alkylene glycols, such as ethylene glycol; carbon monoxide; and coordinating monomers, such as styrene, acrylonitrile and hydroxyalkyl (meth)acrylates. With some embodiments, the ligand is selected from one or more substituted bipyridines, such as 4,4'-dialkylbipyridyls.

In preparing the polymers prepared by controlled radical polymerization (such as ATRP) having at least two cyclic carbonate groups, the amounts and relative proportions of initiator, transition metal compound and ligand are those for which ATRP is most effectively performed. The amount of initiator used can vary widely and is typically present in the reaction medium in a concentration of from $10^{-4}$ moles/liter (M) to 3 M, such as from $10^{-3}$ M to $10^{-1}$ M. As the molecular weight of the cyclic carbonate functional polymer can be directly related to the relative concentrations of initiator and monomer(s), the molar ratio of initiator to monomer is an important factor in polymer preparation, with some embodiments.

The oxirane functional monomers and monomers that are free of oxirane functionality, from which the polymers prepared by controlled radical polymerization having at least two cyclic carbonate groups can be prepared, include but are not limited to those classes and examples recited previously herein with regard to the polymers prepared by free radical polymerization having at least two cyclic carbonate groups.

The cyclic carbonate functional polymer can, with some embodiments, have polymer architecture selected from linear polymers, branched polymers, hyperbranched polymers, star polymers, graft polymers, and mixtures thereof. The form, or gross architecture, of the polymer can be controlled by the choice of initiator and monomers used in its preparation. Linear cyclic carbonate functional polymers can be prepared by using initiators having one or two radically transferable groups, such as diethyl-2-halo-2-methyl malonate and alpha, alpha'-dichloroxylene. Branched cyclic carbonate functional polymers can be prepared by using branching monomers, such as monomers containing radically transferable groups or more than one ethylenically unsaturated radically polymerizable group, such as 2-(2-bromopropionoxy)ethyl acrylate, p-chloromethylstyrene and diethyleneglycol bis(methacrylate). Hyperbranched cyclic carbonate functional polymers can be prepared by increasing the amount of branching monomer used.

Star cyclic carbonate functional polymers can be prepared using initiators having three or more radically transferable groups, such as hexakis(bromomethyl)benzene. Star polymers can be prepared by art-recognized core-arm or arm-core methods. In the core-arm method, the star polymer is prepared by polymerizing monomers in the presence of the polyfunctional initiator, such as hexakis(bromomethyl)benzene. Polymer chains, or arms, of similar composition and architecture grow out from the initiator core, in the core-arm method. With the arm-core method, the arms are prepared separately from the core and can optionally have different compositions, architecture, molecular weight, and PDI's. The arms can have different cyclic carbonate equivalent weights, and some can have no cyclic carbonate functionality. After the preparation of the arms, they are attached to the core by art-recognized methods, so as to result in the formation of an arm-core polymer.

The cyclic carbonate functional polymers prepared by controlled radical polymerization can have, with some embodiments, a cyclic carbonate equivalent weight of at least 100 grams/equivalent, or at least 200 grams/equivalent. The cyclic carbonate equivalent weight of the polymer is, with some embodiments, less than 10,000 grams/equivalent, or less than 5,000 grams/equivalent, or less than 1,000 grams/equivalent. The cyclic carbonate equivalent weight of the cyclic carbonate functional polymer prepared by controlled radical polymerization can range between any combination of these values, inclusive of the recited values, such as from 100 to 10,000 grams/equivalent, or from 200 to 5,000 grams/equivalent, or from 200 to 1,000 grams/equivalent, inclusive of the recited values.

The number average molecular weight (Mn) of the polymers prepared by controlled radical polymerization having at least two cyclic carbonate groups (or the cyclic carbonate functional polymer prepared by controlled radical polymerization) is with some embodiments at least 250, or at least 500, or at least 1,000, or at least 2,000. The cyclic carbonate functional polymer prepared by controlled radical polymerization also has, with some embodiments, an Mn of less than 16,000, or less than 10,000, or less than 5,000. The Mn of the cyclic carbonate functional polymer prepared by controlled radical polymerization can, with some embodiments, range between any combination of these values, inclusive of the recited values, such as from 250 to 16,000, or from 500 to 10,000, or from 1,000 to 5,000, or from 2,000 to 5,000, inclusive of the recited values.

Prior to use in the curable solid particulate compositions of the present invention, the ATRP transition metal catalyst and its associated ligand are, with some embodiments, separated or removed from the cyclic carbonate functional polymer. The ATRP catalyst is removed, with some embodiments, prior to conversion of the precursor polymer to the cyclic carbonate functional polymer. Removal of the ATRP catalyst is achieved, with some embodiments, using known methods, including, for example, adding a catalyst binding agent to the mixture of the oxirane functional polymer or cyclic carbonate functional polymer, solvent and catalyst, followed by filtering. Examples of suitable catalyst binding agents include, but are not limited to, alumina, silica, clay, or combinations thereof. A mixture of the oxirane functional polymer or cyclic carbonate functional polymer, solvent and ATRP catalyst can be passed through a bed of catalyst binding agent, with some embodiments. Alternatively, the ATRP catalyst can be oxidized in situ and retained in the oxirane functional polymer or cyclic carbonate functional polymer.

Each first reactant of the curable solid particulate compositions of the present invention can be prepared, with some embodiments, in the absence of solvent, such as by a bulk polymerization process. With some embodiments, the first reactant is prepared in the presence of a solvent, such as water and/or an organic solvent. Classes of useful organic solvents include, but are not limited to, esters of carboxylic acids, ethers, cyclic ethers, $C_5$-$C_{10}$ alkanes, $C_5$-$C_8$ cycloalkanes, aromatic hydrocarbon solvents, halogenated hydrocarbon solvents, amides, nitrites, sulfoxides, sulfones, and mixtures thereof. Supercritical solvents, such as $CO_2$, $C_1$-$C_4$ alkanes and fluorocarbons, can also be employed. With some embodiments aromatic hydrocarbon solvents are used, such as xylene, and mixed aromatic solvents such as those commercially available from Exxon Chemical America under the trademark SOLVESSO.

The solvent is removed or separated from the first reactant prior to incorporation of the first reactant into the curable solid particulate composition, with some embodiments. The solvent can be removed by art-recognized methods, such as by distillation under conditions of reduced pressure and, optionally, elevated temperature, with some embodiments.

The first reactant, with some embodiments is present in the curable solid particulate composition of the present invention in an amount of at least 50 percent by weight, or at least 70 percent by weight, or at least 80 percent by weight, based on total weight of resin solids of the curable solid particulate composition. The curable solid particulate composition also, with some embodiments, contains the first reactant in an amount of less than or equal to 98 percent by weight, or less than or equal to 95 percent by weight, or less than or equal to 90 percent by weight, based on total weight of resin solids of the curable solid particulate composition. The first reactant can, with some embodiments, be present in the curable solid particulate composition of the present invention in an amount ranging between any combination of these values, inclusive of the recited values, such as from 50 to 98 percent by weight, or from 70 to 95 percent by weight, or from 80 to 90 percent by weight, in each case based on total weight of resin solids of the curable solid particulate composition.

The curable solid particulate compositions of the present invention also include a second reactant having at least two active hydrogen groups that are reactive with the cyclic carbonate groups of the first reactant. With some embodiments, each active hydrogen group of the second reactant is independently chosen from hydroxyl groups, thiol groups, hydrazide groups, and amine groups.

Second reactants having at least two hydroxyl groups can, with some embodiments, be selected from one or more of the hydroxy functional precursor or intermediate materials used to prepare the first reactants as described previously herein. With some embodiments, the second reactant can be selected from: one or more of the polyols used to prepare the polyol residues having at least two cyclic carbonate groups; one or more of the hydroxy functional polyesters used to prepare the polyesters having at least two cyclic carbonate groups; one or more of the hydroxy functional polyethers used to prepare the polyethers having at least two cyclic carbonate groups; one or more of the hydroxy functional polyurethanes used to prepare the polyurethanes having at least two cyclic carbonate groups; and combinations thereof.

Second reactants having at least two hydroxyl groups can, with some embodiments, be selected from: polymers prepared by free radical polymerization that have at least two hydroxyl groups; or polymers prepared by controlled radical polymerization that have at least two hydroxyl groups. With some embodiments, such polymers include at least two residues of hydroxy functional ethylenically unsaturated monomers, such as, but not limited to, hydroxy functional $C_1$-$C_{20}$ linear, branched or cyclic alkyl (meth)acrylates. Such polymers can be prepared in accordance with the methods and monomers as described previously herein with regard to the first reactant.

Second reactants having at least two thiol groups can be prepared by art-recognized methods. With some embodiments, a hydroxy functional material, such as described previously herein with regard to the hydroxy functional second reactant or hydroxy functional precursor/intermediate materials from which the first reactant can be prepared, is reacted with epithiochlorohydrin, which results in the formation of an intermediate material having at least two thiirane groups. The thiirane groups of the intermediate material can, with some embodiments, be subsequently ring-opened in accordance with art-recognized methods so as to form a material having at least two thiol groups, from which the second reactant can be chosen.

Each active hydrogen group of the second reactant is, in accordance with some embodiments, independently selected from amine groups, and each amine group of the second reactant is independently selected from primary amines and secondary amines.

The second reactant, with some embodiments, includes linear or branched aliphatic amines, cycloaliphatic amines, heterocycloaliphatic amines, aromatic amines, heteroaromatic amines, and combinations of two or more thereof.

In accordance with some further embodiments, the second reactant includes diaminocyclohexane, 4,4'-methylenedi(cyclohexylamine), 4,4'-(propane-2,2-diyl)dicyclohexanamine, 3,3'-dimethyl-methylenedi(cyclohexylamine), 4,4'-(propane-2,2-diyl)dianiline, 4,4'-methylenedianiline, piperazine, N-amino ethyl piperazine, 5-amino-1-aminomethyl-1,3,3-trimethyl-cyclohexane, diamino ethane, diamino propane, diaminobutane, diaminopentane, diaminohexane, diaminoheptane, diaminooctane, diaminodecane, diaminoundecane, diaminododecane, dicyandiamide dicyanamide, 4,4'-diaminodiphenyl sulfone, melamine, and combinations of two or more thereof.

The second reactant (b) is present, with some embodiments, in the curable particulate composition of the present invention in an amount of at least 2 percent by weight, or at least 5 percent by weight, or at least 10 percent by weight, based on total weight of resin solids of the curable particulate composition. The second reactant (b) can also, with some embodiments be present in the curable particulate composition in an amount of less than or equal to 50 percent by weight, or less than or equal to 30 percent by weight, or less than or equal to 20 percent by weight, based on total weight of resin solids of the curable particulate composition. The second reactant can be present in the curable particulate composition of the present invention in an amount ranging between any combination of these values, inclusive of the recited values, such as from 2 to 50 percent by weight, or from 5 to 30 percent by weight, or from 10 to 20 percent by weight, based on total weight of resin solids of the curable particulate composition, and, inclusive of the recited values.

The first reactant (a) is present in the curable solid particulate composition, with some embodiments, in an amount of from 50 to 98 percent by weight, based on total resin solids weight of the curable solid particulate composition; and the second reactant is present in the curable solid particulate composition, with some embodiments, in an amount of from 2 to 50 percent by weight, based on total resin solids weight of the curable solid particulate composition.

To achieve a suitable level of cure with the curable solid particulate composition of the present invention, the equivalent ratio of cyclic carbonate equivalents of the first reactant (a) to active hydrogen equivalents of the second reactant (b) is, with some embodiments, from 0.7:1 to 2:1, or from 0.8:1 to 1.3:1.

The curable solid particulate composition of the present invention can also, with some embodiments, include pigments and fillers. Examples of pigments include, but are not limited to: inorganic pigments, such as titanium dioxide and iron oxides; organic pigments, such as phthalocyanines, anthraquinones, quinacridones and thioindigos; and carbon blacks. Examples of fillers include, but are not limited to: silica, such as precipitated silicas; clay; and barium sulfate. When used in the composition of the present invention, pigments and fillers can, with some embodiments, be present in amounts of from 0.1 percent to 70 percent by weight, based on the total weight of the curable solid particulate composition.

The curable solid particulate composition of the present invention can, with some embodiments, optionally contain additives such as, but not limited to: waxes for flow and wetting; flow control agents, such as poly(2-ethylhexyl) acrylate; degassing additives such as benzoin; adjuvant resin to modify and optimize coating properties; antioxidants; and ultraviolet (UV) light absorbers. Examples of useful antioxidants and UV light absorbers include, but are not limited to, those available commercially from BASF under the trademarks IRGANOX and TINUVIN. These optional additives, when used, can be present in amounts up to 20 percent by weight, based on total weight of the curable solid particulate composition.

The curable solid particulate composition of the present invention can, with some embodiments, be prepared by first dry blending the first reactant (a), the second reactant (b), and, optionally, additives, such as flow control agents, degassing agents, antioxidants and UV absorbing agents, in a dry blender, such as a HENSCHEL blade dry blender. The dry blender is operated for a period of time that is at least sufficient to result in a homogenous dry blend of the materials charged thereto. The homogenous dry blend is then melt blended in a melt blender, such as an extruder, such as a twin screw co-rotating extruder, operated within a temperature range of 80° C. to 140° C., or from 100° C. to 125° C. The extrudate of the curable solid particulate composition of the present invention is cooled and, when used as a powder coating composition, is typically milled to an average particle size of from 15 to 40 microns, or from 20 to 30 microns, with some embodiments.

The first reactant and second reactant of the curable solid particulate composition of the present invention are each independently: resinous and having a glass transition temperature (Tg); or crystalline and having a crystalline melting point. By "resinous" is meant that the reactant is composed of a majority of amorphous domains, and, can optionally have some crystalline domains. By "crystalline" is meant that the reactant has a majority of crystalline domains, and, optionally some, such as a minority, of amorphous domains. With some embodiments, a crystalline reactant of the curable solid particulate composition includes some amorphous domains.

The curable solid particulate compositions of the present invention, with some embodiments, melt and flow when exposed to elevated temperature, such as under conditions of cure. In accordance with some further embodiments, when exposed to elevated temperature, such as under conditions of cure, the curable solid particulate compositions of the present invention melt and flow, substantially uniformly, so as to form coatings having substantially uniform thicknesses and, optionally, smooth surfaces.

One or more components of the curable particulate compositions, such as the first reactant and/or the second reactant, are crystalline materials that have lower melt viscosities relative to the melt viscosities of a resinous component or material (having a Tg rather than a melting point). The lower melt viscosity of the crystalline material can, with some embodiments, reduce the overall melt viscosity of the curable solid particulate compositions of the present invention, when they are exposed to elevated temperature, such as under conditions cure, which can result in improved flow and appearance of the resulting cured product, such as a cured coating. With some embodiments, the first and/or second reactants are crystalline materials independently having a melt viscosity of from 5 centipoise (cps) to 75 cps, such as from 7 cps to 60 centipoise (cps), or from 10 cps to 50 cps, as measured at a temperature of 100° C. using an appropriate device, such as an REL heated cone and plate viscometer commercially available from Research Equipment Ltd.

With some embodiments, the first and/or second reactants are resinous materials (having a Tg) which each independently have a melt viscosity of from 10 to 100 poise, or from 20 to 80 poise, or from 30 to 70 poise, as measured at a temperature of 125° C. to 150° C., using an appropriate device, such as an REL heated cone and plate viscometer commercially available from Research Equipment Ltd.

The glass transition temperatures and/or melting points of the first and/or second reactants can be determined in accordance with art-recognized methods. With some embodiments, glass transition temperature values and melting point values are determined using differential scanning calorimetry (DSC) in accordance with art-recognized analytical methods.

In accordance with some embodiments, the first reactant and the second reactant are each resinous materials and each independently have glass transition temperatures (determined by DSC analysis) of from 30° C. to 80° C., or from 35° C. to 50° C. With some embodiments, at least one of the first reactant and the second reactant is a resinous material.

With some embodiments, one of the first reactant and the second reactant is a crystalline material, and the other of the first reactant and the second reactant is a resinous material. The crystalline first reactant or crystalline second reactant can, with some embodiments, have a melting point (as determined by DSC analysis) of at least 80° C. and less than or equal to 300° C., or at least 100° C. and less than or equal to 300° C., or at least 110° C. and less than or equal to 200° C., or at least 115° C. and less than or equal to 150° C., or at least 120° C. and less than or equal to 130° C., inclusive of the recited values, any combination of these recited lower and upper values, and any intervening values.

With some embodiments, the first reactant is resinous and has a glass transition temperature, such as of from 30° C. to 80° C., or from 35° C. to 50° C., as measured by DSC.

With some further embodiments, the first reactant is crystalline and has a crystalline melting point, such as at least 80° C. and less than or equal to 300° C., or at least 100° C. and less than or equal to 300° C., or at least 110° C. and less than or equal to 200° C., or at least 115° C. and less than or equal to 150° C., or at least 120° C. and less than or equal to 130° C., inclusive of the recited values, any combination of these recited lower and upper values, and any intervening values, as determined by DSC.

The curable solid particulate composition of the present invention can, with some embodiments, be free flowing.

The curable solid particulate composition of the present invention can be cured by any suitable methods. With some embodiments, the curable solid particulate composition is thermosetting, and is curable by exposure to elevated temperature. As used herein, by "cured" is meant a three-dimensional crosslink network formed by covalent bond formation, such as between the cyclic oxirane groups of the first reactant and the active hydrogen groups of the second reactant. The temperature at which the thermosetting composition of the present invention is cured is variable and depends in part on the amount of time during which curing is conducted. With some embodiments, the thermosetting composition is cured at a temperature within the range of 80° C. to 204° C., or from 149° C. to 204° C., or from 154° C. to 177° C., for a period of 20 to 60 minutes.

In accordance with some further embodiments, the curable solid particulate composition of the present invention is a powder coating composition. With some further embodiments, the curable solid particulate composition of the present invention is a thermosetting powder coating composition.

The curable solid particulate composition of the present invention can, with some embodiments be used to coat a substrate, such as when it is in the form of a curable powder coating composition. The present invention also relates to a method of coating a substrate that involves: (a) applying to the substrate a thermosetting composition; (b) coalescing the thermosetting composition to form a substantially continuous film; and (c) curing the thermosetting composition by exposure to elevated temperature. The thermosetting composition includes, or is defined by, the curable solid particulate composition of the present invention as previously described herein.

The curable solid particulate composition of the present invention can be applied, with some embodiments, to the substrate by any appropriate art-recognized methods. With some embodiments, the curable solid particulate composition (which can be a thermosetting composition with some embodiments) is in the form of a dry powder, such as a powder coating, and is applied by spray application. Alternatively, the dry powder can be slurried in a liquid medium such as water, and spray applied. As used herein, the term "curable solid particulate composition" means a curable solid particulate composition that can be in dry powder form or in the form of a slurry that includes one or more liquids, such as water and, optionally, one or more organic solvents, such as alcohols.

When the substrate is electrically conductive, the curable solid particulate composition can be electrostatically applied, with some embodiments. Electrostatic spray application generally involves drawing the curable solid particulate composition from a fluidized bed and propelling it through a corona field. The particles of the curable solid particulate composition become charged as they pass through the corona field and are attracted to and deposited upon the electrically conductive substrate, which is grounded. As the charged particles begin to build up, the substrate becomes insulated, thus, limiting further particle deposition. This insulating phenomenon can limit the film build of the deposited composition to a maximum of 3 to 6 mils (75 to 150 microns), with some embodiments.

Alternatively, when the substrate is not electrically conductive, for example, as is the case with many plastic substrates, the substrate is preheated prior to application of the curable solid particulate composition, with some embodiments. The preheated temperature of the substrate is equal to or greater than that of the melting point of the curable solid particulate composition, but less than its cure temperature, with some embodiments. With spray application over preheated substrates, film builds of the curable solid particulate composition in excess of 6 mils (150 microns) can be achieved, such as 10 to 20 mils (254 to 508 microns). Substrates that can be coated by the method of the present invention include, but are not limited to: metal substrates, such as ferrous substrates and aluminum substrates; plastic substrates, such as sheet molding compound based plastics; inorganic substrates, such as ceramic substrates, and glass substrates comprising silica-based glass; wood; and combinations of two or more thereof.

After application to the substrate, the curable solid particulate composition of the present invention is then coalesced to form a substantially continuous film, with some embodiments. Coalescing of the applied curable solid particulate composition is generally achieved through the application of heat at a temperature equal to or greater than that of the melting point of the curable solid particulate composition, but less than its cure temperature. In the case of preheated substrates, the application and coalescing steps can be achieved in essentially one step.

The coalesced curable solid particulate composition of the present invention is next cured by the application of heat. The temperature at which the curable solid particulate composition of the present invention is cured is variable and depends in part on the amount of time during which curing is conducted. Temperatures at which the curable solid particulate composition can be cured include, but are not limited to, those temperatures and ranges as recited previously herein, such as from 80° C. to 204° C., or from 149° C. to 204° C., or from 154° C. to 177° C., for a period of 20 to 60 minutes.

The curable solid particulate composition of the present invention can be applied as a single layer or multiple layered coating, in which each layer has the same or different compositions. The curable solid particulate composition of the present invention can be applied in conjunction with one or more other coating compositions, such as, but not limited to, primers, base coats, and/or clear coatings. The curable solid particulate compositions of the present invention can be used to form (or as) primers, base coats, and/or clear coatings. As used herein, the term "clear coatings" includes, with some embodiments, transparent top coats. Coatings formed from the curable solid particulate compositions of the present invention can, with some embodiments, have a thickness of from 0.5 to 6 mils (13 to 150 microns), or from 1 to 3 mils (25 to 75 microns).

The present invention is more particularly described in the following examples, which are intended to be illustrative only, since numerous modifications and variations therein

EXAMPLES

Synthesis Example A

A bis(cyclic carbonate) of the diglycidyl ether of 4,4'-(propane-2,2-diyl)diphenol was prepared using the materials and related amounts as summarized in the following Table A-1.

TABLE A-1

| | Weight (grams) |
|---|---|
| diglycidyl ether of 4,4'-(propane-2,2-diyl)diphenol[1] | 400 |
| tetrabutylammonium bromide | 10 |
| triphenyl phosphite | 1.2 |
| 1-methoxy-2-propanol[2] | 266 |

[1]Obtained commercially from Momentive under the tradename EPON 880 liquid epoxy resin.
[2]Obtained commercially from Dow Chemical Company under the tradename DOWANOL PM solvent.

The ingredients as listed in the above Table A-1 were charged to a 1 gallon stainless steel pressure reactor that was equipped with an overhead stirrer, gas inlet, outlet pipes, a heating jacket, thermocouple, and pressure gauge. The reactor was closed and charged with gaseous $CO_2$ to a pressure of 50 psi. With constant stirring at a rate of 500 rpm, the contents of the reactor were heated to and held at 130° C. for 4.5 hours. The contents of the reactor were subjected to distillation at reduced pressure, after which the reduced solids contents of the reactor were removed therefrom.

The cyclic carbonate functional product of Synthesis Example A was analyzed by NMR and it was determined that 87 percent of the glycidyl ether groups of the diglycidyl ether of 4,4'-(propane-2,2-diyl)diphenol feed material had been converted to cyclic carbonate groups. The cyclic carbonate functional product of Synthesis Example A was found to have a solids of 70.3 percent by weight, as determined at a temperature of 110° C. for 60 minutes. For reference, a schematic representation of Synthesis Example A is provided in the following Scheme (II).

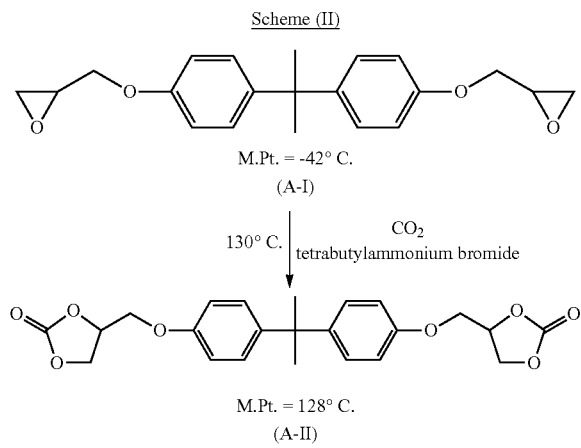

With reference to Scheme (II), product (A-II) had a melt viscosity of 16 centipoise (cps) as measured at a temperature of 100° C. using an REL heated cone and plate viscometer commercially available from Research Equipment Ltd. will be apparent to those skilled in the art. Unless otherwise specified, all parts and percentages are by weight.

With reference to Scheme (II), starting material (A-I) and product (A-II) were analyzed by differential scanning calorimetry (DSC), and the melting points for each are summarized in the following Table A-2. Prior to measuring the melting point by DSC, the bis(cyclic carbonate) product (A-II) was placed in an oven at 100° C. for 30 minutes to drive of remaining solvent. The dried bis(cyclic carbonate) product (A-II) was found to have a solids of 98 percent by weight. The DSC analysis was conducted using a TAI Discovery DSC apparatus. In each case, specimens were sealed in aluminum hermetic pans, which were subjected to the following sequence of cooling and heating: (i) cooling to −90° C.; heating to 175° C.; cooling to −90° C.; and heating to 175° C. Heating was conducted in each case at a rate of 20° C./minute. The DSC was operated with a nitrogen purge rate of 50 mL/minute, and was calibrated with indium, tin, and zinc standards. Melting points were determined manually from the final heating cycle.

TABLE A-2

| Material | Melting Point |
|---|---|
| (A-I) | −42° C. |
| (A-II) | 128° C. |

Synthesis Example B

A bis(cyclic carbonate) of the diglycidyl ether of 4,4'-(propane-2,2-diyl)dicyclohexanol was prepared using the materials and related amounts as summarized in the following Table B-1.

TABLE B-1

| | Weight (grams) |
|---|---|
| diglycidyl ether of 4,4'-(propane-2,2-diyl)dicyclohexanol[3] | 400 |
| tetrabutylammonium bromide | 10 |
| triphenyl phosphite | 1.2 |
| butyl acetate | 266 |

[3]Obtained commercially from Momentive under the tradename EPONEX 1510 liquid epoxy resin.

The ingredients as listed in the above Table B-1 were charged to a 1 gallon stainless steel pressure reactor that was equipped with an overhead stirrer, gas inlet, outlet pipes, a heating jacket, thermocouple, and pressure gauge. The reactor was closed and charged with gaseous $CO_2$ to a pressure of 50 psi. With constant stirring at a rate of 500 rpm, the contents of the reactor were heated to and held at 130° C. for 4.5 hours. The contents of the reactor were subjected to distillation at reduced pressure, after which the reduced solids contents of the reactor were removed therefrom.

The cyclic carbonate functional product of Synthesis Example B was analyzed by NMR and it was determined that 91 percent of the glycidyl ether groups of the diglycidyl ether of 4,4'-(propane-2,2-diyl)dicyclohexanol feed material had been converted to cyclic carbonate groups. The cyclic carbonate functional product of Synthesis Example B was found to have a solids of 66.8 percent by weight, as determined at a temperature of 110° C. for 60 minutes. For reference, a schematic representation of Synthesis Example B is provided in the following Scheme (III).

Scheme (III)

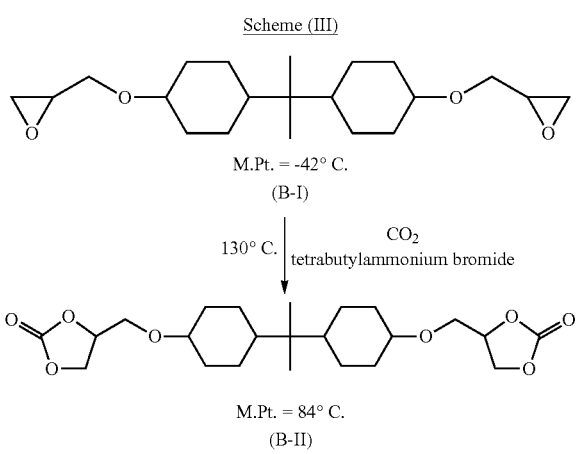

With reference to Scheme (III), product (B-II) had a melt viscosity of 10 centipoise (cps) as measured at a temperature of 100° C. using an REL heated cone and plate viscometer commercially available from Research Equipment Ltd.

With reference to Scheme (III), starting material (B-I) and product (B-II) were analyzed by differential scanning calorimetry (DSC), and the melting points for each are summarized in the following Table B-2. Prior to measuring the melting point by DSC, the bis(cyclic carbonate) product (B-II) was placed in an oven at 100° C. for 30 minutes to drive of remaining solvent. The dried bis(cyclic carbonate) product (B-II) was found to have a solids of 98 percent by weight, at determined at 160° C. for 5 minutes. The melting points recited in Table B-2 were determined in accordance with the DSC analysis as described with regard to Table A-2 previously herein.

TABLE B-2

| Material | Melting Point |
| --- | --- |
| (B-I) | −42° C. |
| (B-II) | 84° C. |

Curable Composition Examples

Curable Composition 1

A metal panel was preheated to a temperature of 200° C. on a nickel-plated hotplate having a surface temperature of 200° C. The bis(cyclic carbonate) product (A-II) of Synthesis Example A was placed in an oven at 100° C. for 30 minutes to drive of remaining solvent. The dried bis(cyclic carbonate) product (A-II) was found to have a solids of 98 percent by weight.

The dried bis(cyclic carbonate) product (A-II) of Synthesis Example A and dicyandiamide were mixed together on the preheated panel, while still on the hotplate, in a stoichiometric ratio of 1:1, in a weight totaling about 50 grams. The composition was mixed by hand using a stainless steel spatula on the preheated panel for about 10 seconds. The mixed molten composition was then drawn-down on the preheated panel using a draw-down bar so as to form a film having a thickness of 5 mils (127 micrometers). The metal panel with film drawn-down thereon was removed from the hotplate and allowed to cool and solidify.

Additional coated panels were prepared in accordance with the above method, and placed in an oven at a temperature of 93° C. (200° F.) for 5 minutes and 25 minutes, and an oven at a temperature of 160° C. (320° F.) for 5 minutes and 25 minutes. The panels were removed from the oven and allowed to cool to room temperature, after which they were subjected to double rubs by hand using a red-rag saturated with methyl ethyl ketone (MEK), which had been drawn over a human index finger. The results of the MEK double rub testing are summarized in the following Table 1.

Comparative Curable Composition 1

Metal panels were coated with a molten composition composed of the feed material (A-I) of Synthesis Example A and dicyandiamide (in a stoichiometric ratio of 1:1) in accordance with the description provided for Curable Composition 1 above. The coated metal panels were placed in an oven at a temperature of 93° C. (200° F.) for 5 minutes and 25 minutes, and an oven at a temperature of 160° C. (320° F.) for 5 minutes and 25 minutes. The panels were removed from the oven and allowed to cool to room temperature, after which they were subjected to double rubs by hand using a red-rag saturated with methyl ethyl ketone (MEK), which had been drawn over a human index finger. The results of the MEK double rub testing are summarized in the following Table 1.

TABLE 1

MEK Double Rub Results

| Oven Exposure Conditions | Comparative Curable Composition 1 | Curable Composition 1 |
| --- | --- | --- |
| 5 min @93° C. | 0.5 MEK double rubs | 70 MEK double rubs |
| 25 min @93° C. | 5 MEK double rubs | +100 MEK double rubs |
| 5 min @160° C. | 10 MEK double rubs | +100 MEK double rubs |
| 25 min @160° C. | +100 MEK double rubs | +100 MEK double rubs |

Films having MEK double rub values of +100 showed no change in visual appearance (by naked eye) after being subjected to 100 double rubs, and were considered to be fully cured. Films having MEK double rub values of less than 100 (e.g., 10 MEK double rubs) were considered to be less than fully cured because the film was observed to have disappeared (i.e., to have been fully solubilized by the MEK) after the indicated number of double rubs.

With reference to Table 1, Curable Composition 1, which is a non-limiting representative embodiment of the present invention, provided films having a significantly improved cure response relative to Comparative Curable Composition 1. Films prepared from Curable Composition 1 were observed to have been fully cured after 25 minutes at 93° C., relative to films prepared from Comparative Curable Composition 1, which were not observed to have obtained full cure until 25 minutes at 160° C.

Curable Composition 2

The bis(cyclic carbonate) product (B-II) of Synthesis Example B was placed in an oven at 100° C. for 30 minutes, to drive off remaining solvent. The resulting dried bis(cyclic carbonate) product (B-II) was found to have a solids of 98 percent by weight, as determined at 160° C. for 5 minutes. Metal panels were coated with a molten composition composed of the dried bis(cyclic carbonate) product material (B-II) of Synthesis Example B and dicyandiamide (in a stoichiometric ratio of 1:1) in accordance with the description provided for Curable Composition 1 above.

The coated metal panels were placed in an oven at a temperature of 93° C. (200° F.) for 5 minutes and 25 minutes, and an oven at a temperature of 160° C. (320° F.) for 5 minutes and 25 minutes. The panels were removed from the oven and allowed to cool to room temperature, after which they were subjected to double rubs by hand using a red-rag saturated with methyl ethyl ketone (MEK), which had been drawn over a human index finger. The results of the MEK double rub testing are summarized in the following Table 2.

Comparative Curable Composition 2

Metal panels were coated with a molten composition composed of the feed material (B-I) of Synthesis Example B and dicyandiamide (in a stoichiometric ratio of 1:1) in accordance with the description provided for Curable Composition 1 above. The coated metal panels were placed in an oven at a temperature of 93° C. (200° F.) for 5 minutes and 25 minutes, and an oven at a temperature of 160° C. (320° F.) for 5 minutes and 25 minutes. The panels were removed from the oven and allowed to cool to room temperature, after-which they were subjected to double rubs by hand using a red-rag saturated with methyl ethyl ketone (MEK), which had been drawn over a human index finger. The results of the MEK double rub testing are summarized in the following Table 2.

TABLE 2

MEK Double Rub Results

| Oven Exposure Conditions | Comparative Curable Composition 2 | Curable Composition 2 |
|---|---|---|
| 5 min @93° C. | 0 MEK double rubs | 30 MEK double rubs |
| 25 min @93° C. | 5 MEK double rubs | +100 MEK double rubs |
| 5 min @160° C. | 10 MEK double rubs | +100 MEK double rubs |
| 25 min @160° C. | 50 MEK double rubs | +100 MEK double rubs |

As discussed with regard to the MEK double rub results presented in Table 1, and with reference to Table 2, films having MEK double rub values of +100 showed no change in visual appearance (by naked eye) after being subjected to 100 double rubs, and were considered to be fully cured. Films having MEK double rub values of less than 100 (e.g., 10 MEK double rubs) were considered to be less than fully cured because the film was observed to have disappeared (i.e., to have been fully solubilized by the MEK) after the indicated number of double rubs.

With reference to Table 2, Curable Composition 2, which is a non-limiting representative embodiment of the present invention, provided films having a significantly improved cure response relative to Comparative Curable Composition 2. Films prepared from Curable Composition 2 were observed to have been fully cured after 25 minutes at 93° C., relative to films prepared from Comparative Curable Composition 2, which were not observed to have obtained full cure after 25 minutes at 160° C.

The above results demonstrate that curable compositions according to the present invention provide improved cure response, such as full cure at lower temperatures, relative to comparative compositions that have oxirane functional reactants rather than cyclic carbonate functional reactants.

The present invention has been described with reference to specific details of particular embodiments thereof. It is not intended that such details be regarded as limitations upon the scope of the invention except insofar as and to the extent that they are included in the accompanying claims.

What is claimed is:

1. A method for preparing a powder coating comprising:
(a) dry blending a curable solid particulate composition to produce a homogenous dry blend, wherein the curable solid particulate composition comprises:
(i) a first reactant comprising a monomer having at least two cyclic carbonate groups bonded thereto; and
(ii) a second reactant comprising at least two active hydrogen groups that are reactive with the cyclic carbonate groups of the first reactant, wherein at least one of the active hydrogen groups of the second reactant comprises an amine group or a thiol group; and
(b) melt blending the dry blend to produce an extrudate.

2. The method of claim 1 further comprising (c) cooling the extrudate.

3. The method of claim 2 further comprising (d) milling the extrudate.

4. The method of claim 1, wherein the curable solid particulate composition further comprises an additive, the additive comprising waxes, flow control agents, degassing additives, adjuvant resins, antioxidants, ultraviolet light absorbers, and/or mixtures thereof.

5. The method of claim 4, wherein the additive is present in amounts up to 20 percent by weight, based on total weight of the curable solid particulate composition.

6. The method of claim 1, wherein the first reactant is selected from:
polyol residues having at least two cyclic carbonate groups,
isocyanurates having at least two cyclic carbonate groups, and
combinations thereof.

7. The method of claim 1, wherein another of the active hydrogen groups of the second reactant comprises a hydroxyl group.

8. The method of claim 1, wherein the amine group comprises diaminocyclohexane, 4,4'-methylenedi(cyclohexylamine), 4,4'-(propane-2,2-diyl)dicyclohexanamine, 3,3'-dimethyl-methylenedi(cyclohexylamine), 4,4'-(propane-2,2-diyl)dianiline, 4,4'-methylenedianiline, piperazine, N-amino ethyl piperazine, 5-amino-1-aminomethyl-1,3,3-trimethyl-cyclohexane, diamino ethane, diamino propane, diaminobutane, diaminopentane, diaminohexane, diaminoheptane, diaminooctane, diaminodecane, diaminoundecane, diaminododecane, xylidine, dicyandiamide, 4,4'-diaminodiphenyl sulfone, melamine, and/or mixtures thereof.

9. The method of claim 1, wherein the ratio of cyclic carbonate equivalents of the first reactant to active hydrogen equivalents of the second reactant is from 0.7:1 to 2:1.

10. The method of claim 1, wherein the first reactant is present in the curable solid particulate composition in an amount of from 50 to 98 percent by weight, based on total resin solids weight, and the second reactant is present in the curable solid particulate composition in an amount of from 2 to 50 percent by weight, based on total resin solids weight.

11. The method of claim 1, wherein the dry blend is melt blended at a temperature of 80° C. to 140° C.

12. The method of claim 1, wherein the extrudate is milled to an average particle size of from 15 to 40 microns.

13. The method of claim 12, wherein the extrudate is milled to an average particle size of from 20 to 30 microns.

14. The method of claim 1, wherein the first reactant and the second reactant each independently have a melting point and/or a glass transition temperature of from 30° C. to 300° C.

15. A curable solid particulate composition comprising:
(a) a solid first reactant comprising a monomer having at least two cyclic carbonate groups; and
(b) a solid second reactant having at least two active hydrogen groups that are reactive with the cyclic carbonate groups of the first reactant,
wherein at least one of the active hydrogen groups of the second reactant comprises an amine group or a thiol group,
wherein the composition is a powder coating composition, and
wherein the first reactant and the second reactant are meltable within a range of cure from 80° C. to 204° C.

16. The curable solid particulate composition of claim 15, wherein the first reactant is selected from:
polyol residues having at least two cyclic carbonate groups,
isocyanurates having at least two cyclic carbonate groups, and
combinations thereof.

17. The curable solid particulate composition of claim 15, wherein the ratio of cyclic carbonate equivalents of said first reactant to active hydrogen equivalents of said second reactant is from 0.7:1 to 2:1.

18. The curable solid particulate composition of claim 15, wherein said first reactant is present in said curable solid particulate composition in an amount of from 50 to 98 percent by weight, based on total resin solids weight, and said second reactant is present in said curable solid particulate composition in an amount of from 2 to 50 percent by weight, based on total resin solids weight.

19. The curable solid particulate composition of claim 15, wherein said curable solid particulate composition is free flowing.

20. The method of claim 1, wherein the first reactant has a molecular weight of 385-441 g/mol.

21. The method of claim 1, wherein the first reactant comprises a bis(cyclic carbonate).

* * * * *